United States Patent
Rekimoto et al.

(10) Patent No.: US 6,823,200 B2
(45) Date of Patent: Nov. 23, 2004

(54) INFORMATION PROCESSING TERMINAL AND METHOD

(75) Inventors: Junichi Rekimoto, Kanagawa (JP); Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 10/045,483

(22) Filed: Oct. 24, 2001

(65) Prior Publication Data

US 2002/0115469 A1 Aug. 22, 2002

(30) Foreign Application Priority Data

Oct. 25, 2000 (JP) ........................................ 2000-324939

(51) Int. Cl.⁷ ................................................ H04M 1/38
(52) U.S. Cl. .................. 455/567; 455/575.1; 455/90.3; 379/374.01; 379/376.01; 434/114; 434/112; 340/7.58; 340/7.6; 179/19.01; 179/19.05; 345/179; 345/183
(58) Field of Search ............................. 455/567, 575.1, 455/90.1, 90.3; 340/7.58, 7.6, 7.63; 379/374.03, 373.01, 376.01, 376.02; 434/114, 112; 178/19.01, 19.05; 345/179, 183

(56) References Cited

U.S. PATENT DOCUMENTS 6,159,013 A * 12/2000 Parienti ...................... 434/114
6,230,135 B1 * 5/2001 Ramsay et al. ............. 704/271
6,389,302 B1 * 5/2002 Vance ......................... 455/567
6,408,072 B1 * 6/2002 Fernandez-Martinez . 379/433.1
6,600,938 B1 * 7/2003 Suzuki ........................ 455/567
6,611,259 B1 * 8/2003 Tillgren et al. ............. 345/179

* cited by examiner

Primary Examiner—William Trost
Assistant Examiner—Danh Le
(74) Attorney, Agent, or Firm—Frommer Lawrence & Haug LLP; William S. Frommer (57) ABSTRACT

A user interface by which contents of what is being processed can be confirmed with the sense of touch is provided. On a first surface of a portable phone, first piezoelectric devices are arranged, and on a second surface of the portable phone, second piezoelectric devices are arranged. When radio waves are transmitted, a displacement is generated from the first and second last piezoelectric devices at the same time when radio waves are transmitted from an antenna, and the displacement moves in sequence to the piezoelectric devices of the upper portion. When the displacement moves to the first and second initial piezoelectric devices, a displacement is generated repeatedly from the first and second last piezoelectric devices, and is continued until the other party to which a call is being originated responds.

6 Claims, 8 Drawing Sheets

INFORMATION PROCESSING TERMINAL AND METHOD

BACKGROUND OF THE INVENTION

1. Field of the Invention

The present invention relates to an information processing terminal and an information processing method. More particularly, the present invention relates to an information processing terminal and an information processing method capable of providing a user interface by which an operation feeling can be felt even more.

2. Description of the Related Art

In recent years, in the field of computer games, various types of controllers in which, when a character in a game operated by a user receives some impact, vibrations are transmitted, have been commercialized.

For example, in a car-race game, when a vehicle operated by a user crashes into a wall, vibrations are generated in the vibration pad mounted in the controller, and the user can feel a sense of realism.

Also, there are some portable phones that have the function of informing users of a call reception by causing the housing thereof to vibrate.

However, since, for all these phones, merely, the entire housing is vibrated, there is a problem in that it is difficult to effectively inform users of various processing which is being performed by the terminal.

SUMMARY OF THE INVENTION

The present invention has been made in view of such circumstances. An object of the present invention is to provide a user interface for an information processing terminal in which users can simply and reliably know contents of what is being processed.

To achieve the above-mentioned object, in one aspect, the present invention provides an information processing terminal comprising: performing means for performing a predetermined process; displacement generation means, having a plurality of displacement sections, for generating a displacement which is transmitted to the hand of the user in contact therewith, the displacement sections protruding from the housing of the information processing terminal; and control means for controlling the timings of individual displacements of the plurality of displacement sections of the displacement generation means in accordance with the process performed by the performing means.

The control means may control the timing of the displacements of a plurality of displacement sections so that, on the whole, the vibration proceeds in a predetermined direction.

The information processing terminal may further comprise communication means for communicating with another apparatus via a network, wherein the control means performs control so that the displacement section is displaced at a different timing between when the communication means receives radio waves from the other apparatus and when the communication means transmits radio waves to the other apparatus.

The information processing terminal may be a portable phone.

The information processing terminal may be a pen-type operation device.

In another aspect, the present invention provides an information processing method for use with an information processing terminal, the information processing method comprising: a performing step of performing a predetermined process; a displacement generation step of generating a displacement in a plurality of displacement sections which protrude from the housing of the information processing terminal, the displacement being transmitted to the hand of the user in contact therewith; and a control step of controlling the timings of individual displacements of the plurality of displacement sections in accordance with the process performed in the performing step.

In the information processing terminal and the information processing method, a predetermined process is performed, and a displacement is generated in a plurality of displacement sections which protrude from the housing of the information processing terminal, the displacement being transmitted to the hand of a user which is in contact therewith. Also, the timings of individual displacements of the plurality of displacement sections are controlled in accordance with a performed process.

According to the information processing terminal and method of the present invention, since the timings of the displacements of a plurality of displacement sections are controlled, it is possible to provide a user interface by which the user can confirm contents of what is being processed with the sense of touch.

Further objects, features and advantages of the present invention will become apparent from the following description of the preferred embodiments with reference to the attached drawings.

DESCRIPTION OF THE PREFERRED EMBODIMENTS

Figure 1A:
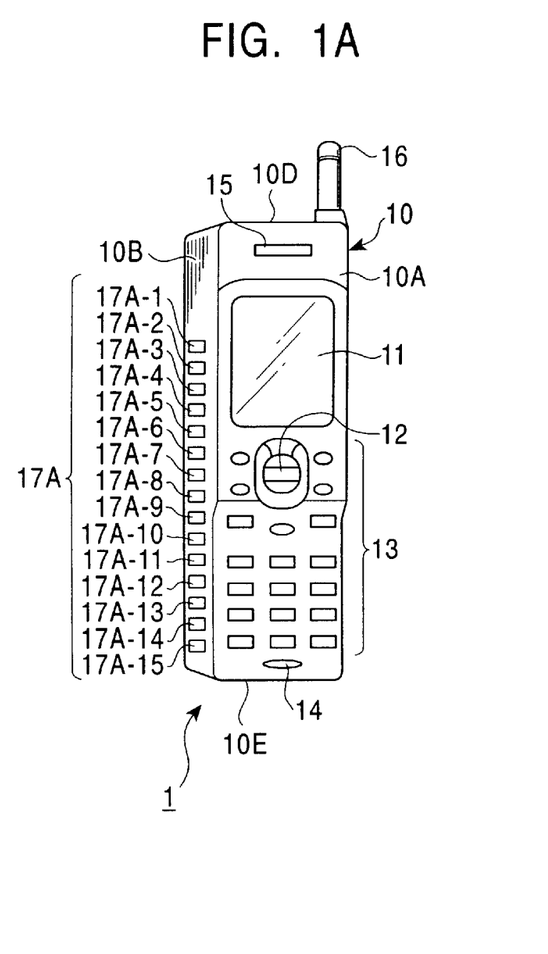
FIG. 1A shows an example of the exterior construction of a portable phone 1 to which the present invention is applied.
Figure 1B:
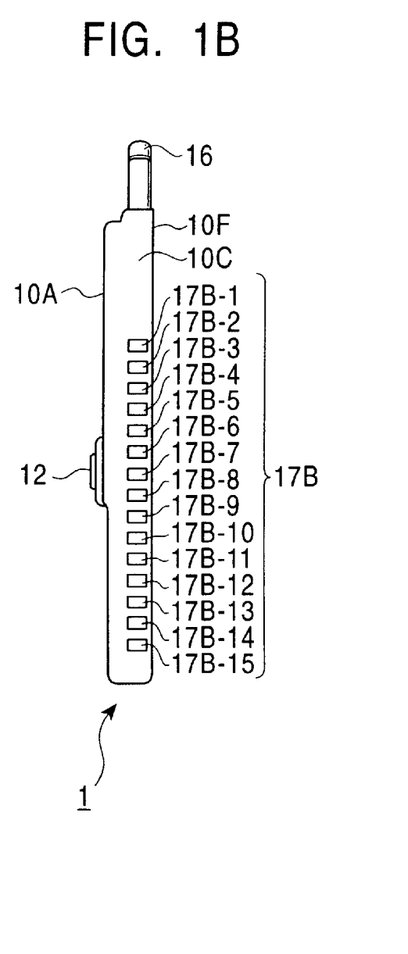
FIG. 1B is a right side view thereof.

FIGS. 1A and 1B show examples of the exterior construction of a portable phone 1 to which the present invention is applied. FIG. 1A shows an example of the construction of the front (surface 10A) and the left side (surface 10B) of the portable phone 1. FIG. 1B shows an example of the construction of the right side (surface 10C) thereof.

A liquid-crystal display 11 is disposed at substantially the center of the surface 10A of a housing 10. On the liquid-crystal display 11, information, such as the radio-wave receiving conditions, the remaining level of the battery, the name of the other party and the telephone number registered in a telephone directory, and the call-origination history, is displayed.

The portable phone 1 is compatible with a simplified form of the Internet (for example, i mode (trademark)), and on the liquid-crystal display 11, a simplified home page on the simplified Internet, and the contents of electronic mail are displayed.

Below the liquid-crystal display 11 of the surface 10A, a jog dial 12 which is pivoted in the up and down direction is provided in such a manner so as to slightly protrude from the surface of the surface 10A.

When the user pivots the jog dial 12 in order to, for example, select a desired telephone number from a plurality of telephone numbers of a list of telephone directories displayed on the liquid-crystal display 11, and presses the jog dial 12 toward the inside of the housing 10, it is possible to instruct the starting of a call-origination process with respect to the terminal corresponding to the selected telephone number.

Operation keys 13 consisting of the numeric keys of "0" to "9", a call-origination key, a redial key, a call-termination/power-supply key, a clear key, an electronic mail key, etc., are provided around the jog dial 12 and below the liquid-crystal display 11 on the surface 10A of the housing 10. It is possible for the user to input various instructions by operating the operation keys 13.

A microphone 14 is provided below the operation keys 13 on the surface 10A, and a speaker 15 is provided above the liquid-crystal display 11 on the surface 10A. The voice of the user during a telephone conversation is captured by the microphone 14, and the voice of the other party during the telephone conversation is output from the speaker 15.

On the surface 10B of the housing 10, piezoelectric devices 17A-1 to 17A-15 are disposed in a straight line from the top toward the bottom in such a manner as to slightly protrude from the housing 10. On the surface 10C (FIG. 1B) of the housing 10, piezoelectric devices 17B-1 to 17B-15 are arranged in a straight line from the top toward the bottom. Hereinafter, when there is no need to individually identify the piezoelectric devices 17A-1 to 17A-15, these are referred to collectively as a "piezoelectric device 17A", and when there is no need to individually identify the piezoelectric devices 17B-1 to 17B-15, these are referred to collectively as a "piezoelectric device 17B". Furthermore, when there is no need to individually identify the piezoelectric devices 17A and 17B, these are referred to collectively as a "piezoelectric device 17".

The piezoelectric device 17, made of a ceramic having a high electromechanical coupling coefficient (for example, PZT (lead zirconate titanate)), is a device in the shape of a thin plate which, when a voltage is applied, is strained instantly in the thickness direction (the direction perpendicular to the surfaces 10B and 10C) and generates a displacement.

The displacement generated by each piezoelectric device 17 is a displacement which the user holding the portable phone 1 can recognize with the sense of touch in the hand. This is set by adjusting the voltage applied to the piezoelectric device 17 or by adjusting the number of laminated layers of the ceramic device. The surface of the piezoelectric device 17 is covered with a protection layer formed of an acrylic resin, etc.

On the right side of a surface 10D (top surface) of the housing 10, an antenna 16 is provided. Radio waves transmitted from the portable phone 1 to a relay station are transmitted from the antenna 16, and radio waves transmitted from the relay station are received by the antenna 16.

Figure 2:
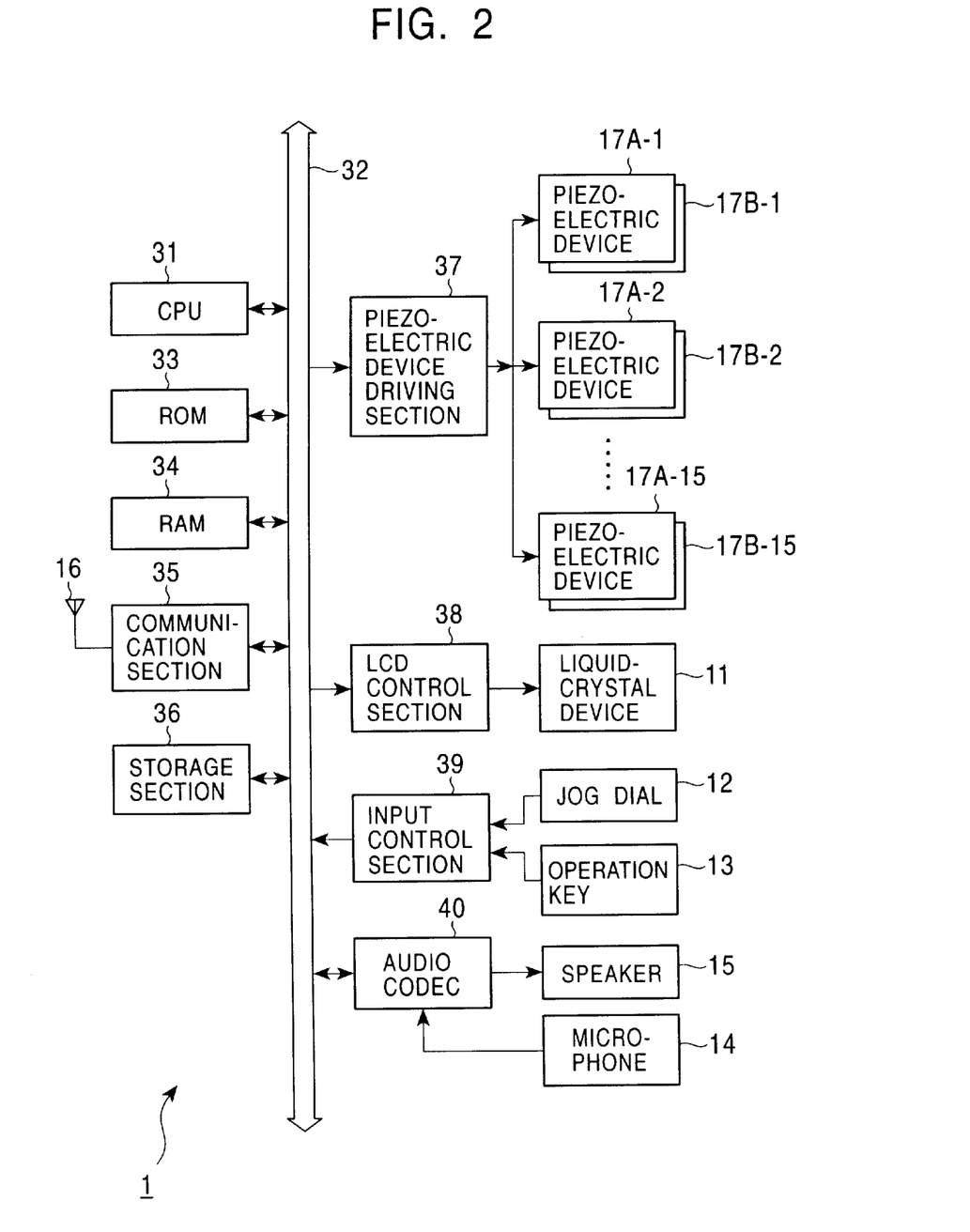
FIG. 2 is a block diagram showing an example of the interior construction of the portable phone 1 of FIG. 1.

FIG. 2 is a block diagram showing an example of the interior construction of the portable phone 1. Components in FIG. 2 corresponding to those in FIG. 1 are given the same reference numerals, and descriptions thereof are omitted where appropriate.

A CPU (Central Processing Unit) 31 controls the entire operation of the portable phone 1. That is, each processing section of the portable phone 1 is connected to the CPU 31 via a bus 32.

The CPU 31 loads a control program stored in a ROM (Read Only Memory) 33 into a RAM (Random Access Memory) 34, and executes various processing in accordance with the control program.

A communication section 35 performs a spectrum diffusion process on digital audio data transferred from an audio codec 40 in the speech transmission mode, or performs a spectrum diffusion process on text data transferred from an input control section 39 in the data communication mode, performs a digital-to-analog conversion process and a frequency conversion process thereon, and, thereafter, transmits the data from the antenna 16.

Also, the communication section 35 amplifies a received signal received by the antenna 16, and performs a frequency conversion process and an analog-to-digital conversion process thereon in order to perform an inverse spectrum diffusion process. Also, the communication section 35 transfers the digital audio data obtained during the speech transmission mode or the text data obtained during the data communication mode to the audio codec 40 and an LCD (Liquid Crystal Display) control section 38, respectively.

A storage section 36, which is formed of a flash memory, etc., stores the names and the telephone numbers of other parties which are registered in a telephone directory, the call-origination history, etc. Text data of electronic mail which is transmitted and received via the simplified Internet is also stored.

The piezoelectric device driving section 37 drives the piezoelectric device 17 under the control of the CPU 31. That is, the CPU 31 has, in the storage section 36, a program in which the timing at which the piezoelectric device 17 is driven is written.

An LCD control section 38 receives, via the input control section 39, text data which is input by the user operating the jog dial 12 or the operation keys 13, and displays the text data on the liquid-crystal display 11 under the control of the CPU 31.

Also, the LCD control section 38 displays, on the liquid-crystal display 11, a file of a simplified home page, which is downloaded from a server on the simplified Internet and which is transferred via the communication section 35.

The input control section 39 transfers text data input by the user operating the jog dial 12 or the operation keys 13 to the communication section 35, the LCD control section 38, or the storage section 36 under the control of the CPU 31.

The audio codec 40, during the speech transmission mode, converts the audio signal of the user, captured by the microphone 14, into digital audio data, and transfers the converted digital audio data to the communication section 35 under the control of the CPU 31.

Also, the audio codec 40, during the speech transmission mode, converts the digital audio data transferred from the communication section 35 into an analog signal, so that the voice is output from the speaker 15.

The power required when each of the processing sections performs a process is supplied from a battery pack (not shown) stored in the housing 10 of the portable phone 1.

Figure 3:
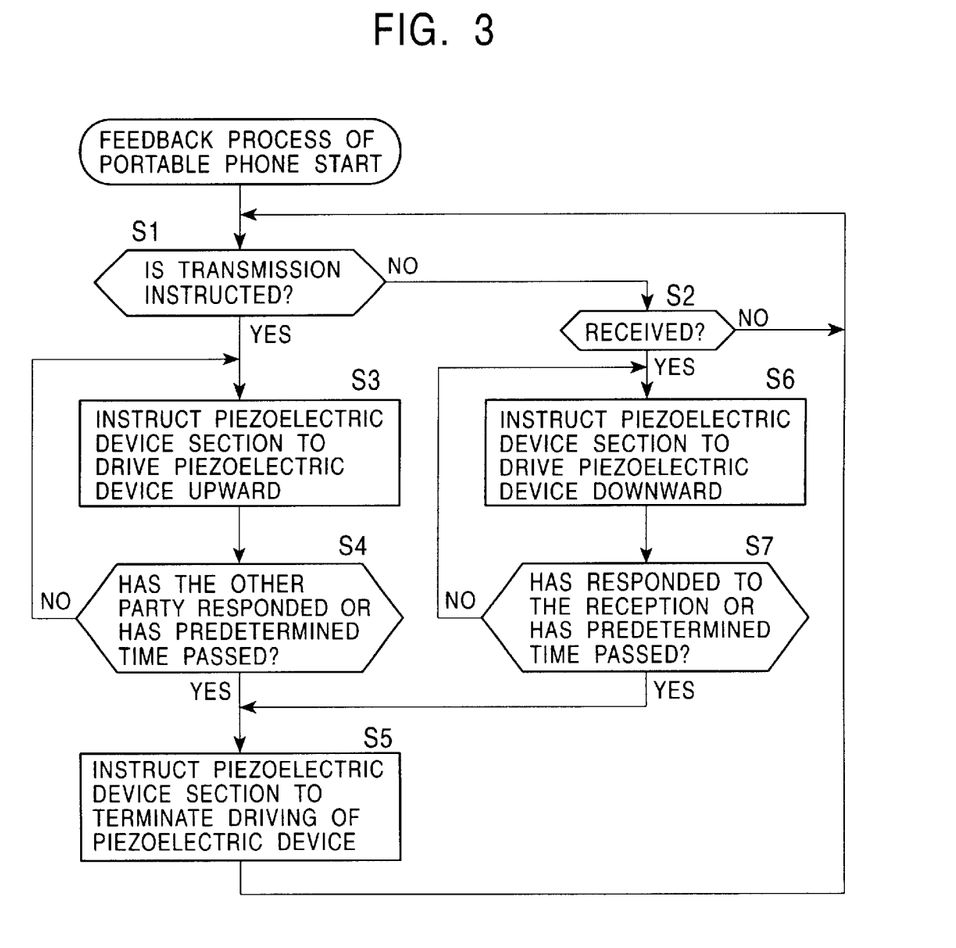
FIG. 3 is a flowchart illustrating the process of the portable phone 1 of FIG. 1.

Next, referring to the flowchart in FIG. 3, a feedback process of the portable phone 1 with respect to the user holding the housing 10 is described.

In step S1, the CPU 31 determines whether or not a transmission is instructed from the user. When it is determined that a transmission is not instructed, the process proceeds to step S2. In step S2, the CPU 31 determines whether or not the radio waves transmitted from the relay station are received by the antenna 16. When it is determined that the radio waves are not received, the process returns to step S1.

In step S1, when the user instructs a telephone conversation with respect to another portable phone by operating the jog dial 12 or the operation keys 13, the CPU 31 determines that a transmission is instructed, and the process proceeds to step S3.

In step S3, the CPU 31 instructs the piezoelectric device driving section 37 to drive the piezoelectric device 17 in sequence from the bottom toward the top in accordance with the transmission of the radio waves from the antenna 16.

The piezoelectric device driving section 37 receiving this instruction drives each piezoelectric device 17 in sequence in order of the piezoelectric devices 17-15, 17-14, 17-13, . . . , 17-2, and 17-1, so that each device generates a displacement.

Figure 4:
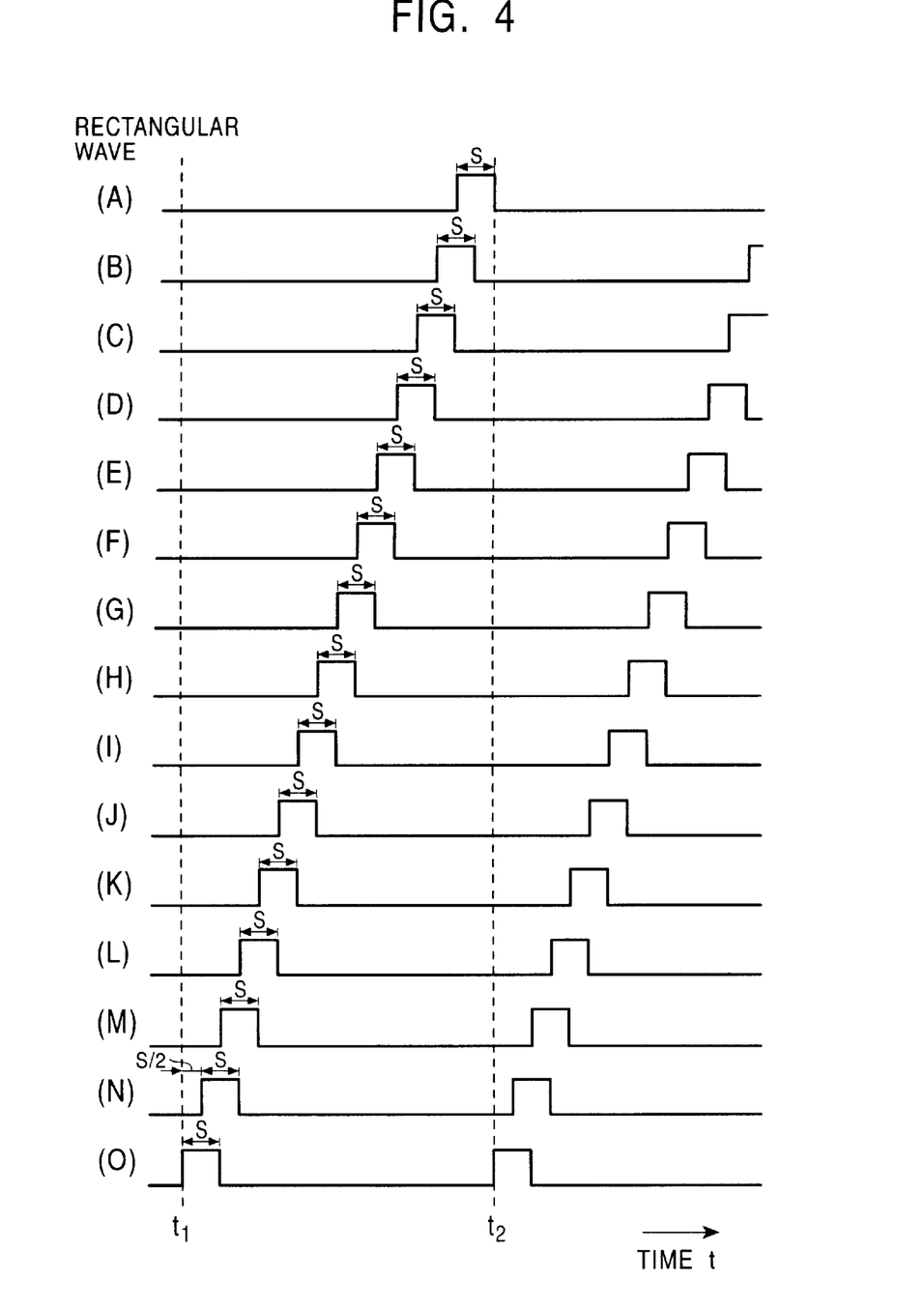
FIG. 4 illustrates an example of a timing at which a piezoelectric device driving section 37 of FIG. 2 applies a voltage.

FIG. 4 illustrates a timing at which the piezoelectric device driving section 37 applies a voltage to the piezoelectric device 17.

In FIG. 4, a rectangular wave of the topmost portion (part (A) of FIG. 4) shows the timing at which the piezoelectric device driving section 37 drives the piezoelectric device 17-1, and the next rectangular wave (part (B) of FIG. 4) shows the timing at which the piezoelectric device driving section 37 drives the piezoelectric device 17-2. Hereinafter, in a similar manner, the rectangular waves of part (C) to part (O) of FIG. 4 correspond to the timings at which the piezoelectric devices 17-3 to 17-15 are driven, respectively. The right direction in FIG. 4 shows the time axis.

As shown in part (O) of FIG. 4, the piezoelectric device driving section 37 drives the piezoelectric device 17-15 for a time s (seconds) from time $t_1$ in accordance with instructions from the CPU 31.

Also, as shown in part (N) of FIG. 4, the piezoelectric device driving section 37 drives the piezoelectric device 17-14 for a predetermined time (s) when the amount of time s/2 (seconds) passes from time $t_1$.

Hereafter, the piezoelectric device driving section 37 drives the piezoelectric devices 17-13 to 17-1 in sequence at the same timing. Then, at the timing of time $t_2$ at which the driving of the piezoelectric device 17-1 is terminated, driving is repeated in sequence again starting from the piezoelectric device 17-15.

Figure 5A:
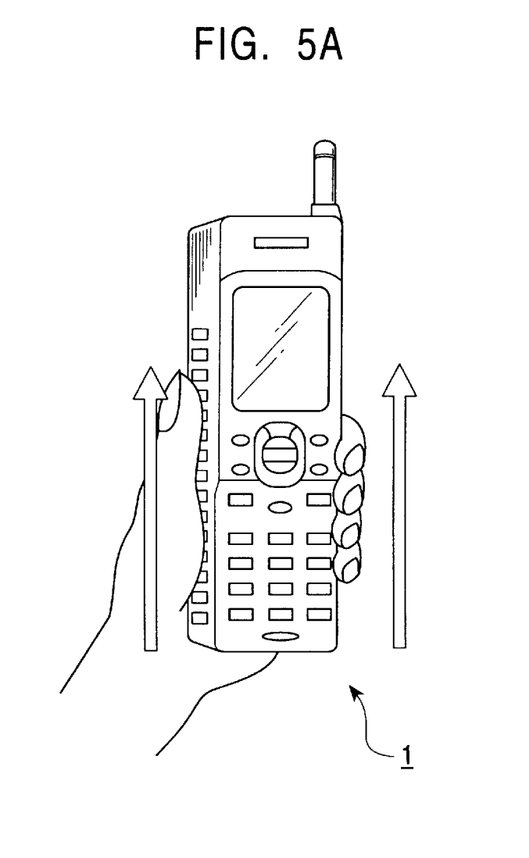
FIGS. 5A and 5B illustrate the movement of a displacement.

In this manner, the piezoelectric devices 17-15 to 17-1 are displaced in sequence at intervals of a predetermined time s. As shown in FIG. 5A, as a feedback with respect to the user inputting a transmission of radio waves, the user holding the portable phone 1 can feel the vibrations transmitted from the bottom toward the top (the direction indicated by a hollow arrow in FIG. 5A) with the sense of touch.

In step S4, the CPU 31 determines whether or not a response has occurred from the telephone set of the other party which transmitted radio waves via a relay station or whether or not a predetermined time has passed from when a call to the telephone set of the other party originated. The CPU 31 performs the process of step S3 repeatedly until a response occurs or until a predetermined time passes. That is, the feedback from the bottom toward the top is generated while the telephone set of the other party is being called.

When the CPU 31 determines in step S4 that a response occurred from the telephone set of the other party to be called up, or determines that a predetermined time has passed from when a call to the telephone set of the other party originated, the process proceeds to step S5.

In step S5, the CPU 31 instructs the piezoelectric device driving section 37 to terminate the driving process of the piezoelectric device 17. In response to this instruction, the piezoelectric device driving section 37 terminates the driving process of the piezoelectric device 17. At this time, if the other party has responded, the telephone conversation is started, and when a predetermined time has passed, the call-origination operation is terminated.

Thereafter, the process returns to step S1, and processing of step S1 and subsequent steps is repeatedly performed.

On the other hand, when the CPU 31 determines in step S2 that the radio waves from the relay station are received by the antenna 16 (a call from another telephone set is received), the process proceeds to step S6.

In step S6, the CPU 31 instructs the piezoelectric device driving section 37 to drive the piezoelectric device 17 from the top toward the bottom in response to the reception of the radio waves in the antenna 16. At the same time, the CPU 31 causes a received-call tone to be generated from a received-call tone speaker (not shown).

The piezoelectric device driving section 37 receiving this instruction drives the piezoelectric devices 17-1 to 17-15 in sequence at intervals of a predetermined time so that a displacement is generated. That is, contrary to the above-described radio-wave transmission time, a feedback from the top toward the bottom is generated.

Figure 6:
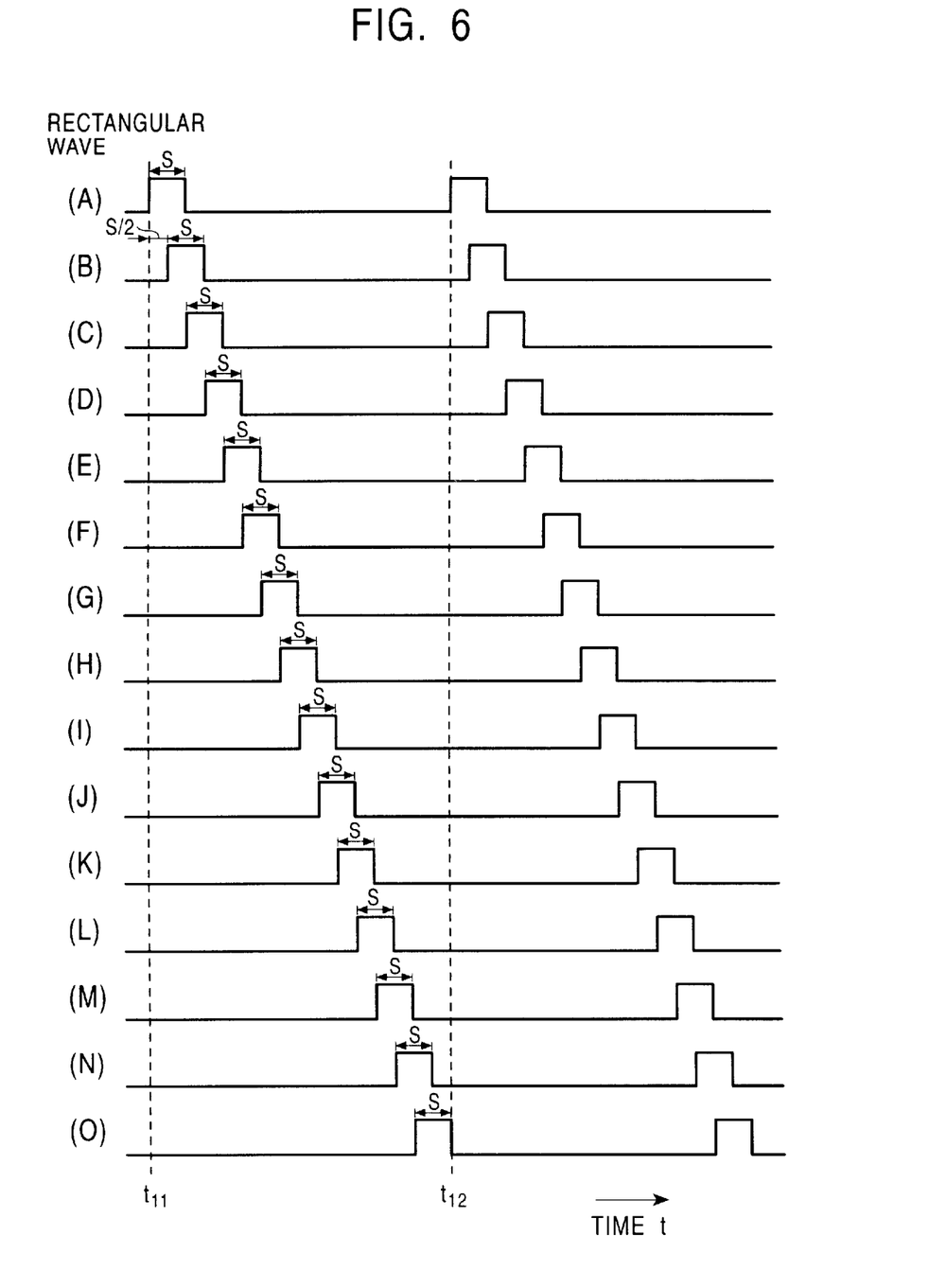
FIG. 6 illustrates another example of a timing at which the piezoelectric device driving section 37 of FIG. 2 applies a voltage.

FIG. 6 illustrates a timing at which the piezoelectric device driving section 37 drives the piezoelectric device 17 in the process of step S6. Similarly to FIG. 4, each of parts (A) to (O) of FIG. 6 shows the driving timing of each of the piezoelectric devices 17-1 to 17-15.

As shown in part (A) of FIG. 6, the piezoelectric device driving section 37 drives the piezoelectric device 17-1 for a time s (seconds) from time $t_{11}$ in accordance with instructions from the CPU 31.

Also, as shown in part (B) of FIG. 6, the piezoelectric device driving section 37 drives the piezoelectric device 17-2 similarly for a time s (seconds) from when the amount of time of a time s/2 (seconds) passes from time $t_{11}$.

The piezoelectric device driving section 37 also drives the piezoelectric devices 17-3 to 17-15 in sequence at the same timing. At the timing of time $t_{12}$ at which the driving of the piezoelectric device 17-15 is terminated, driving is repeated again starting from the piezoelectric device 17-1.

Figure 5B:
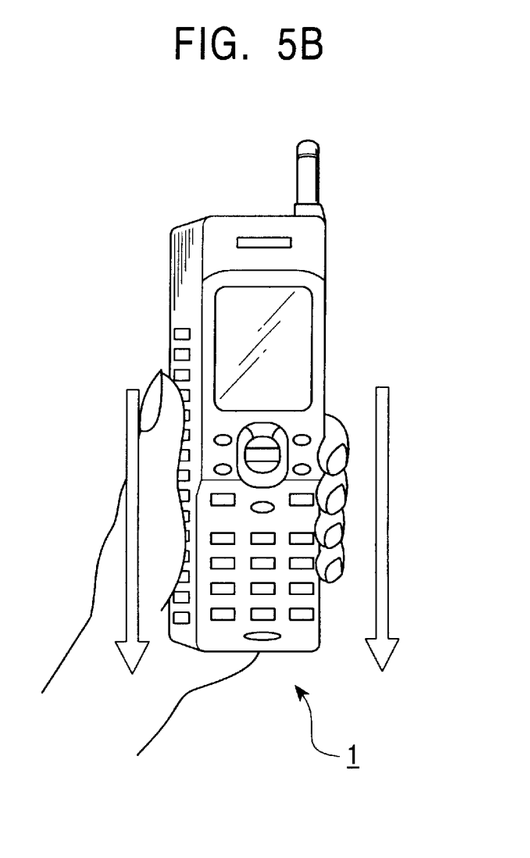

In this manner, the piezoelectric devices 17-1 to 17-15 are driven in sequence at intervals of a predetermined time s (seconds). As shown in FIG. 5B, as a feedback with respect to the reception of the radio waves, the user holding the portable phone 1 can feel the vibrations transmitted from the top toward the bottom with the sense of touch.

In step S7, the CPU 31 determines whether or not the user of the portable phone 1 has responded to the call reception from another telephone set or whether or not a predetermined time has passed from when the call is received. The CPU 31 performs the process of step S6 repeatedly until a response occurs or until a predetermined time passes.

When the CPU 31 determines in step S7 that, for example, the user has responded by operating the operation key 13 or determines that a predetermined time has passed from when the call is received, the process proceeds to step S5.

In step S5, the CPU 31 instructs the piezoelectric device driving section 37 to terminate the process of driving the piezoelectric device 17. In response to this instruction, the piezoelectric device driving section 37 terminates the process of driving the piezoelectric device 17. When a predetermined time has passed, at the same time, a received-call tone which is being output from a received-call tone speaker (not shown) is terminated. When a response is instructed, a telephone conversation process is started.

Thereafter, the process returns to step S1, and processing of step S1 and subsequent steps is performed repeatedly.

In this manner, by generating various feedbacks in response to various processing of the CPU 31, a user interface can be realized by which the user of the portable phone 1 can confirm the process at that time more easily and reliably. As a result, for example, even when the user is visually impaired, it becomes possible to reliably recognize the operating state.

In the foregoing, a pattern, in which vibration is transmitted from the piezoelectric device 17-1 toward the piezoelectric device 17-15 or vice versa, is fed back. However, since the piezoelectric device 17 can generally deal with a high-frequency operation, it is also possible to generate a pattern of a more complex feedback pattern.

Figure 7:
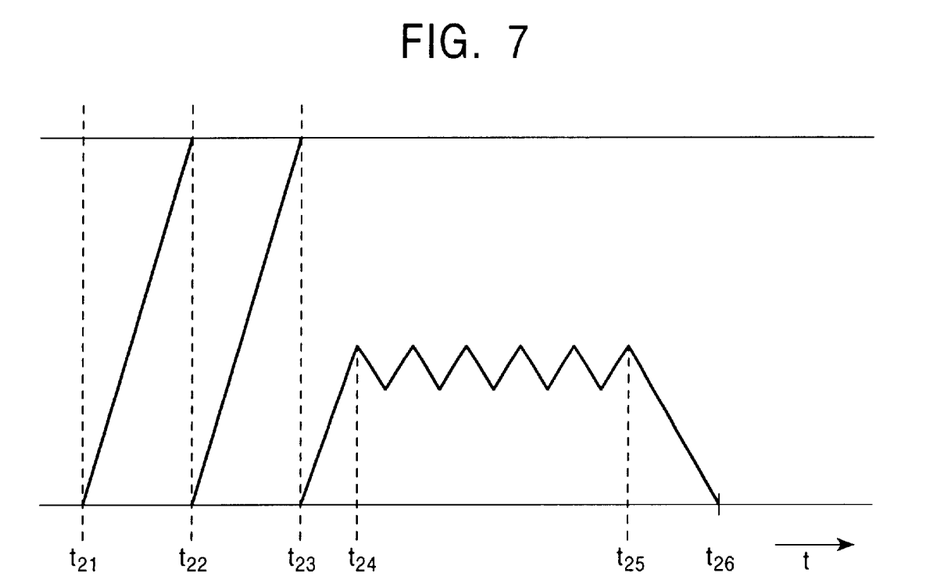
FIG. 7 illustrates another example of a timing at which the piezoelectric device driving section 37 of FIG. 2 applies a voltage.

FIG. 7 shows an example of a pattern of a feedback (the timing at which the piezoelectric device driving section 37 applies a voltage) generated by the portable phone 1 when a call-origination process is performed with respect to another telephone set in order to perform a telephone conversation. FIG. 7 is a view which is more macroscopic with respect to time in comparison with FIGS. 4 and 6.

When the user operates the jog dial 12 and the operation keys 13 in order to select the telephone number of the other party and to instruct a call-origination process, at time $t_{21}$, a feedback pattern from the bottom toward the top is generated from the piezoelectric device 17-15 to the piezoelectric device 17-1. In the example of FIG. 7, it is shown that this is performed for two cycles (patterns from time $t_{21}$ to $t_{22}$, and from time $t_{22}$ to $t_{33}$) and that the other party to which a call is being originated has responded in the middle of the third cycle (time $t_{24}$).

At the timing which indicates that a telephone conversation is in progress (times $t_{24}$ to $t_{25}$) after the user of the other telephone set has responded, a saw-tooth feedback pattern is generated by the operation of the central portion within the piezoelectric device 17 (for example, the piezoelectric devices 17-5 to 17-10).

Thereafter, when the telephone conversation is terminated (time $t_{25}$), a feedback pattern is generated from the central portion (the piezoelectric device 17-10) within the piezoelectric device 17 towards the bottom (the piezoelectric device 17-15).

In the foregoing, the case of the speech transmission mode was described. Also, during the data communication mode, similarly, a feedback pattern can be generated. An example of a feedback pattern in such a case is shown in FIG. 8.

Figure 8:
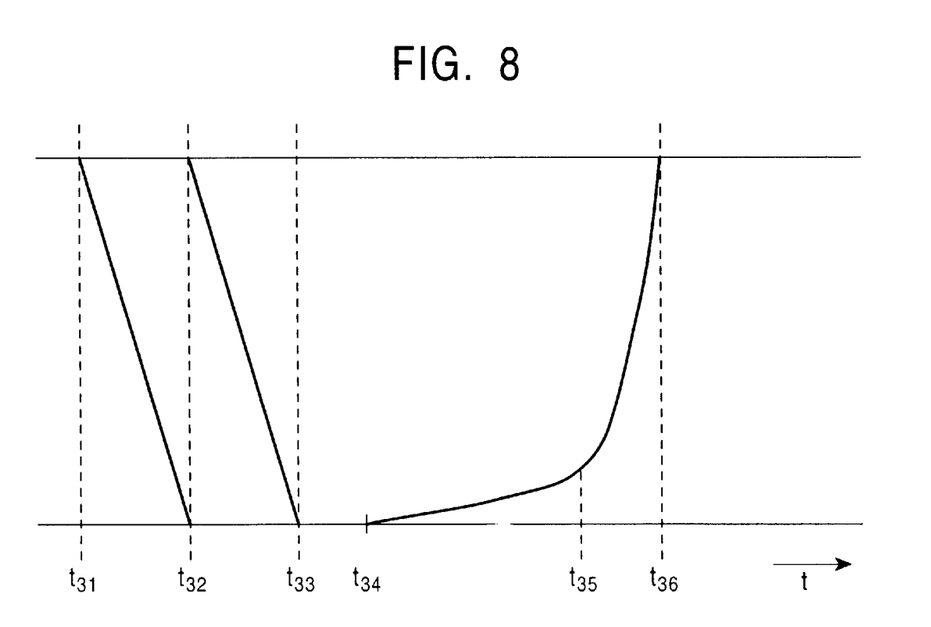
FIG. 8 illustrates another example of a timing at which the piezoelectric device driving section 37 of FIG. 2 applies a voltage.

In the example of FIG. 8, at time $t_{31}$, the user inputs a command to browse a simplified home page on the simplified Internet by operating the jog dial 12 or the operation keys 13. In response to this, data is transmitted from a simplified-home-page providing server.

In response to the reception of radio waves in the antenna 16, that is, the downloading of a simplified home page, a displacement is generated in sequence from the piezoelectric device 17-1 to the piezoelectric device 17-15 (from time $t_{31}$ to time $t_{32}$). In the example of FIG. 8, two cycles of a feedback pattern from the piezoelectric device 17-1 to the piezoelectric device 17-15 are made (from time $t_{31}$ to time $t_{32}$ and from time $t_{32}$ to time $t_{33}$). This is determined by the amount of data of the simplified home page to be downloaded.

Thereafter, at time $t_{34}$, the displacement generated from the piezoelectric device 17-15 moves gradually (slowly) upward, and at the timing of $t_{35}$, the displacement moves quickly. This is used as a feedback in a case where, for example, the amount of data which is to be transmitted to the simplified-home-page providing server is large.

As described above, the feedback generated by the piezoelectric device 17 can be formed into various patterns. In a manner similar to the user being capable of setting a received-call tone of one's own preference, a preference feedback pattern may also be set by operating the jog dial 12 or the operation keys 13. It is a matter of course that a program in which the driving timing is written, such as that shown in FIGS. 7 and 8, may be downloaded from the simplified Internet. In such a case, the downloaded program is stored in the storage section 36.

In the foregoing, although the cases of the speech transmission mode and the data communication mode are described, for example, the present invention can also be applied to a case in which a game downloaded from the simplified Internet is performed in the portable phone 1. In this case, when a character in the game operated by the user receives an impact, the piezoelectric device 17 is driven in response thereto, and the hand of the user is contacted with pressure.

Also, although the piezoelectric device 17 is arranged on the surfaces 10B to 10C of the portable phone 1, the piezoelectric device 17 may be arranged on another surface, for example, on a surface 10F (rear surface) of the housing 10.

Figure 9:
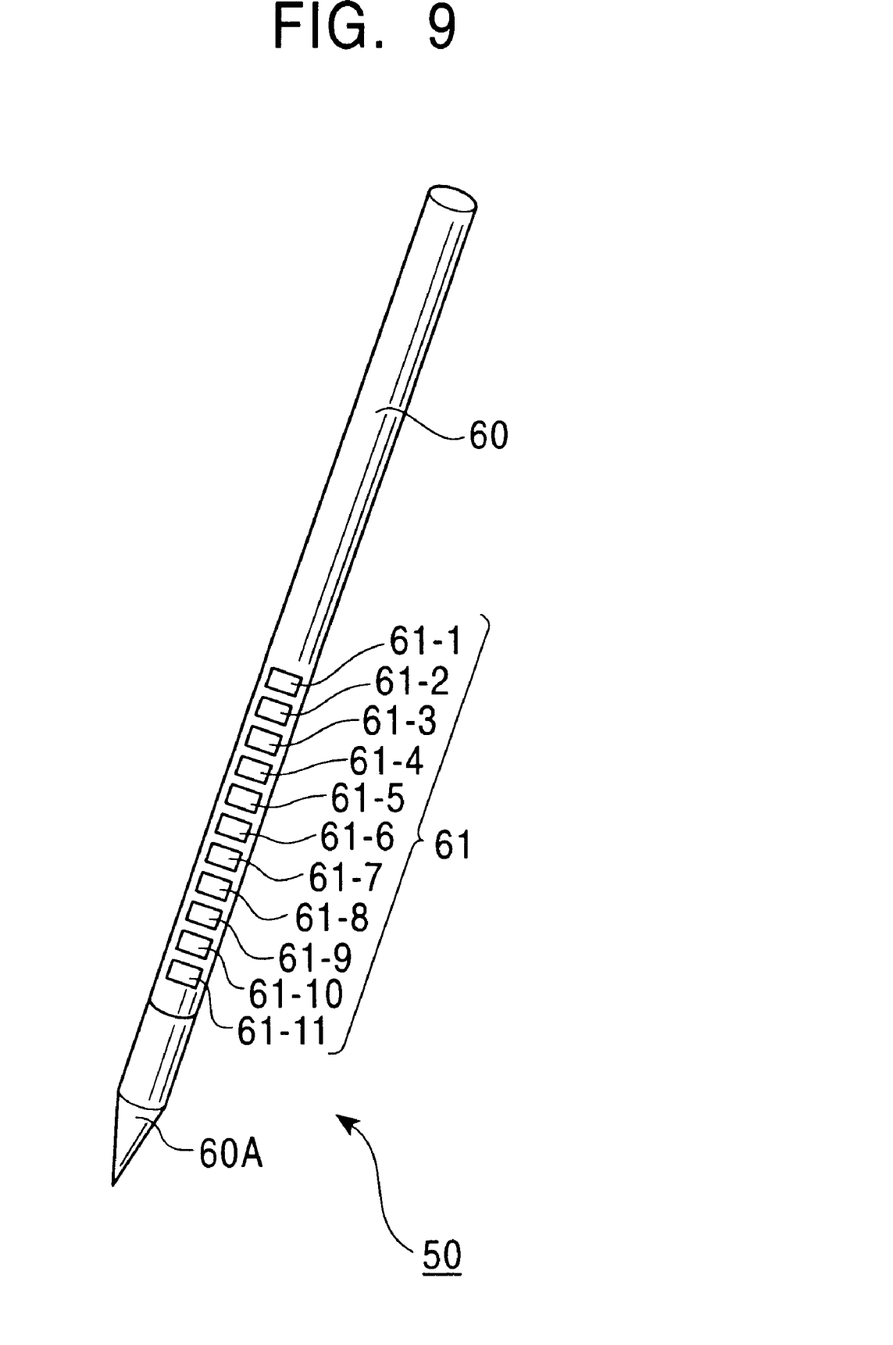
FIG. 9 show s an example of the exterior construction of an input pen 50 to which the present invention is applied.

Furthermore, in the foregoing, although the case in which the information processing terminal is the portable phone 1 was described, the present invention can also be applied to another apparatus. FIG. 9 shows an example of the exterior construction of an input pen 50 which inputs various processes to a PDA (Personal Digital Assistant). The input pen 50 generates a feedback pattern in response to an input of the user.

On the surface of a housing 60 of the input pen 50, piezoelectric devices 61-1 to 61-11 are arranged. It is possible for the user to input various instructions by causing an input section 60A of the input pen 50 to press against the touch panel (not shown) of the PDA. In response to this input, a displacement based on various feedback patterns is generated in the piezoelectric devices 61-1 to 61-11 of the housing 60.

For example, in the text data input mode, when a predetermined range is specified and copied, at the same time when the copying is specified, it is possible to cause a displacement to move from the piezoelectric device 61-11 on the lower-end side of the housing 60 to the piezoelectric device 61-1 on the upper-end side thereof. The speed at which the displacement of the piezoelectric device 61 moves may be varied in accordance with the amount of data to be copied.

Thereafter, when the copied data of the predetermined range is to be pasted onto another place, at the same time when the pasting is instructed, the displacement moves from the piezoelectric device 61-1 on the upper-end side of the housing 60 to the piezoelectric device 61-11 on the lop-eared side thereof.

As a result, when data of a predetermined range is to be copied, it is possible for the user holding the input pen 50 to obtain a sensation as if absorbing data without material substance which is displayed in two dimensions. Also, when the data is pasted, it is possible for the user to obtain a sensation as if data is being released.

In addition, it is possible to apply such a user interface as that described above to a mouse, including a mouse pointer, of a conventional personal computer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing terminal which is held by a user's hand and is used, said information processing terminal comprising:

performing means for performing a predetermined process;

displacement generation means, having a plurality of displacement sections, for generating a displacement which is transmitted to the hand of said user in contact therewith, said displacement sections protruding from the housing of said information processing terminal; and control means for controlling the timings of individual displacements of the plurality of displacement sections of said displacement generation means in accordance with said process performed by said performing means.

2. An information processing terminal according to claim 1, wherein said control means controls the timings of the displacements of said plurality of displacement sections, so that, on the whole, vibrations proceed in a predetermined direction.

3. An information processing terminal according to claim 1, further comprising communication means for communicating with another apparatus via a network, wherein said control means performs control so that said displacement section is displaced at a different timing between when said communication means receives radio waves from said other apparatus and when said communication means transmits radio waves to said other apparatus.

4. An information processing terminal according to claim 1, wherein said information processing terminal is a portable phone.

5. An information processing terminal according to claim 1, wherein said information processing terminal is a pen-type operation device.

6. An information processing method for use with an information processing terminal which is held by a user's hand and is used, said information processing method comprising:

a performing step of performing a predetermined process;

a displacement generation step of generating a displacement in a plurality of displacement sections which protrude from the housing of said information processing terminal, said displacement being transmitted to the hand of said user in contact therewith; and a control step of controlling the timings of individual displacements of the plurality of displacement sections in accordance with said process performed in said performing step.

\* \* \* \* \*